United States Patent
Matthews et al.

(10) Patent No.: US 9,866,456 B2
(45) Date of Patent: Jan. 9, 2018

(54) SYSTEM AND METHOD FOR NETWORK HEALTH AND MANAGEMENT

(71) Applicant: Avago Technologies General IP (Singapore) Pte. Ltd., Singapore (SG)

(72) Inventors: William Brad Matthews, San Jose, CA (US); Mohan Venkatachar Kalkunte, Saratoga, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 170 days.

(21) Appl. No.: 14/590,122

(22) Filed: Jan. 6, 2015

(65) Prior Publication Data

US 2016/0080218 A1 Mar. 17, 2016

Related U.S. Application Data

(60) Provisional application No. 62/051,549, filed on Sep. 17, 2014.

(51) Int. Cl.
*H04L 12/26* (2006.01)
*H04L 12/24* (2006.01)

(52) U.S. Cl.
CPC .......... *H04L 43/04* (2013.01); *H04L 41/0823* (2013.01); *H04L 41/0866* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 2008/0154804 A1* | 6/2008 | Dawson | G06F 11/3409 706/8 |
| 2013/0031240 A1* | 1/2013 | Byzek | G06F 9/50 709/224 |
| 2013/0290512 A1* | 10/2013 | Ngoo | H04L 41/147 709/224 |

* cited by examiner

*Primary Examiner* — Kevin Bates
*Assistant Examiner* — Lesa Kennedy
(74) *Attorney, Agent, or Firm* — Foley & Lardner LLP

(57) ABSTRACT

A system and method for network health and management. Intelligent assessments of a current or new network configuration can be performed based on a health of the network that is derived using health messages that are indicative of the utilization of one or more forwarding tables in a plurality of network switches.

20 Claims, 4 Drawing Sheets

SYSTEM AND METHOD FOR NETWORK HEALTH AND MANAGEMENT

This application claims the benefit of and priority to provisional application No. 62/051,549, filed Sep. 17, 2014, which is incorporated herein by reference in its entirety.

BACKGROUND

Field

The present disclosure relates generally to networking and, more particularly, to a system and method for network health and management.

Introduction

Increasing demands are being placed upon the data communications infrastructure. These increasing demands are driven by various factors, including the increasing bandwidth requirements of Internet multimedia applications (e.g., distribution of news, financial data, software, video, audio and multi-person conferencing, etc). To accommodate the increasing bandwidth requirements, communication link speeds have also continued to evolve. For example, 10 Gigabit Ethernet (GbE) ports are commonly used for I/O on many of today's network switches.

Management of these data communication networks is becoming increasingly difficult as static, hierarchical network switch architectures have difficulty adapting to the dynamic needs of the data communication network. For example, traffic patterns are increasingly complex as virtualization and cloud computing services continue to grow in application. Moreover, access to these services must also consider the increasing usage of mobile computing devices such as smart phones and tablets. In general, these various factors create an environment where an increasing premium is being placed on effective management of a data communications infrastructure.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Figure 1:
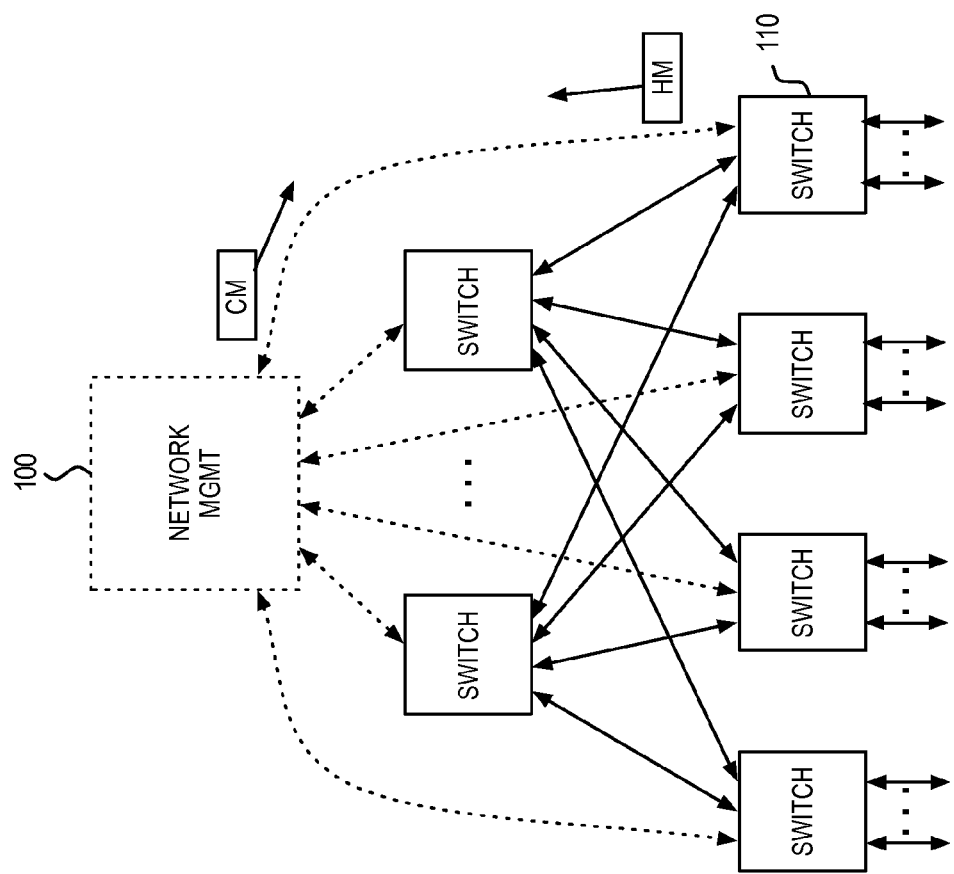
FIG. 1 illustrates an example embodiment of a network having a plurality of network switches.

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Server virtualization is a key element in enabling cloud computing applications and infrastructure. In general, server virtualization abstracts the number and identity of individual physical servers, processors, and operating systems, from actual server users. By this abstraction, a single physical server machine can be partitioned into multiple independent virtual servers. These independent virtual servers can be migrated from one physical machine to another physical machine as needed. For example, migration of a virtual server to a particular machine can be driven due to load balancing or in response to a hardware failure.

Administration of these Virtual LANs (VLANs) can be challenging when considering the port reconfiguration needed when migrating virtual servers to different physical machines. Traffic flows will differ substantially whenever virtual servers are migrated. Flexible controls in managing the various network resources used by these virtual servers is therefore a key element of overall network administration. As network management personnel are increasingly responsible for administrating greater numbers of physical machines, the effectiveness of network management tools grows in importance in today's data center environment.

As would be appreciated, the increasing use of bandwidth-intensive devices such as smartphones, tablets, and notebooks augments the challenges of network managers in responding to rapidly changing resource, Quality of Service (QoS), and security requirements.

In the present disclosure, a network management system and method is provided that enables intelligent assessments of an impact of a new potential network configuration prior to the roll out of the new network configuration. In one embodiment, the network management method includes receiving, via a communications network from a plurality of network switches in a network, a plurality of health messages from the respective plurality of network switches. In one embodiment, a health messages received from one of the plurality of network switches includes one or more parameters that are indicative of the utilization of one or more forwarding tables in the one of the plurality of network switches. Using the received plurality of health messages, a network management station can then be configured to determine a measure of a health of the network.

Based on the determined measure of the health of the network, the network management station can then be configured to determine whether a configuration request for the network (e.g., deployment of X virtual machines) can be satisfied. If it is determined that the configuration request can be accommodated by the network, then the network management station can transmit, via a communications network, a plurality of configuration messages to the plurality of network switches to implement the new network configuration in whole or in part.

Prior to describing the details of the network management system and method of the present disclosure, reference is made first to FIG. 1, which illustrates an example embodiment of a network having a plurality of network switches. Without loss of generality, the plurality of network switches can include Ethernet switches (Layer 2), Internet routers (Layer 3), transport switches (Layer 4), or application layer switching and routing. As would be appreciated, the particular type, configuration and interconnectivity of the plurality of switches in the network would be implementation dependent.

As illustrated, a plurality of switches are each coupled to network management station 100. Network management station 100 can be configured to monitor a health of the network, which includes the plurality of network switches. The monitoring of the health of the network can be based on the receipt of health messages (HMs) from the plurality of network switches. As illustrated, network switch 110 can be configured to transmit a health message to network management station 100.

In general, the health messages that are received by network management station 100 from the plurality of network switches would enable network management station 100 to assess the health of the network such that the impact of a roll out of a potential new network configuration can be examined prior to the actual reconfiguration of the network. In this process, the current health of the network can lead to an assessment of whether the potential new network configuration would be a bad "fit" for the network. In this scenario, the potential new network configuration can be adjusted when such a bad "fit" is identified.

Figure 2:
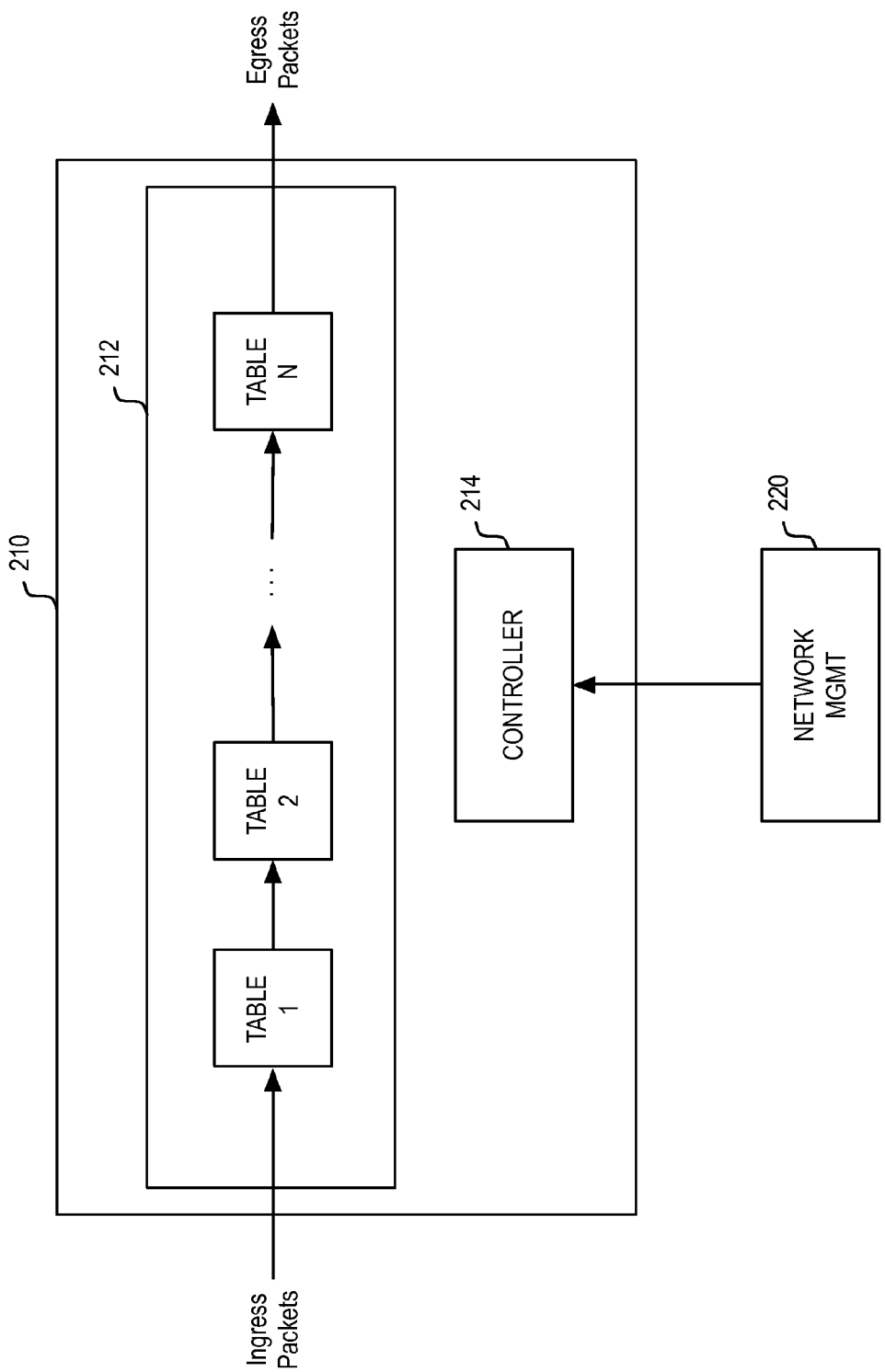
FIG. 2 illustrates an example embodiment of a network switch.

FIG. 2 illustrates an example embodiment of a network switch. In one embodiment, network switch 210 can be enabled via software-defined networking (SDN). In one embodiment, network switch 210 is enabled via the Open-Flow architecture, which is described in greater detail in the Open Network Foundation's OpenFlow Switch Specification, Version 1.3.0.

In general, OpenFlow is an architecture for network switches that separates control and data forwarding planes. The OpenFlow architecture is based on an abstract switch that embodies a forwarding plane, a logically centralized network management controller that is external from the network switch, and a control protocol between the network switch and the centralized network management controller that enables the centralized network management controller to program the network switch. This separation of the control plane from the forwarding plane allows for more sophisticated traffic management than is feasible using access control lists (ACLs) and routing protocols of existing switches.

As illustrated in FIG. 2, switch 210 includes a forwarding plane 212 that includes a plurality of forward routing tables (1-N). Forwarding plane 212 is configured to receive ingress packets along with metadata on a logical port of switch 210. The logical port may or may not correspond directly to a hardware physical interface of network switch 210.

Forwarding plane 210 includes a pipeline having one or more processing stages, wherein each of the one or more processing stages perform packet processing in accordance with a respective forwarding table that includes a plurality of forwarding table entries. Each of the plurality of forwarding table entries are configured to match and process packets and the metadata in accordance with a set of match fields. The metadata can be matched and written at each table and enables the pipeline to carry state between tables. As the packet goes through the packet-processing pipeline, a packet is associated with an action set, which is resolved at the end of the packet-processing pipeline and applied to the packet. The end result of processing by the packet-processing pipeline is a delivery of a packet with associated meta data to a logical port for ultimate delivery to an egress side of network switch 210. Again the logical port may or may not correspond to a hardware physical interface of network switch 210.

As further illustrated, network switch 210 includes a controller 214 that is operative to configure the plurality of forward routing tables (1-N). Configuration of the plurality of forward routing tables (1-N) is based on communication with a centralized network management controller 220. In general, network management controller 220 can configure and write entries into tables 1-N in forwarding plane 212 using the OpenFlow protocol. The OpenFlow protocol effectively moves the network control out of proprietary network switches and into control software that is open source and locally managed.

In the present disclosure, it is recognized that cloud applications, usage models, and other data center requirements are significantly influencing network infrastructure design. A critical element of this design is scalability. The size of the forwarding tables in network switches is limited. Accordingly, forwarding table utilization can impact data center scalability, which has a corresponding impact on the number of servers and virtual machines per server, load-balancing and bandwidth across the various switch links.

Figure 3:
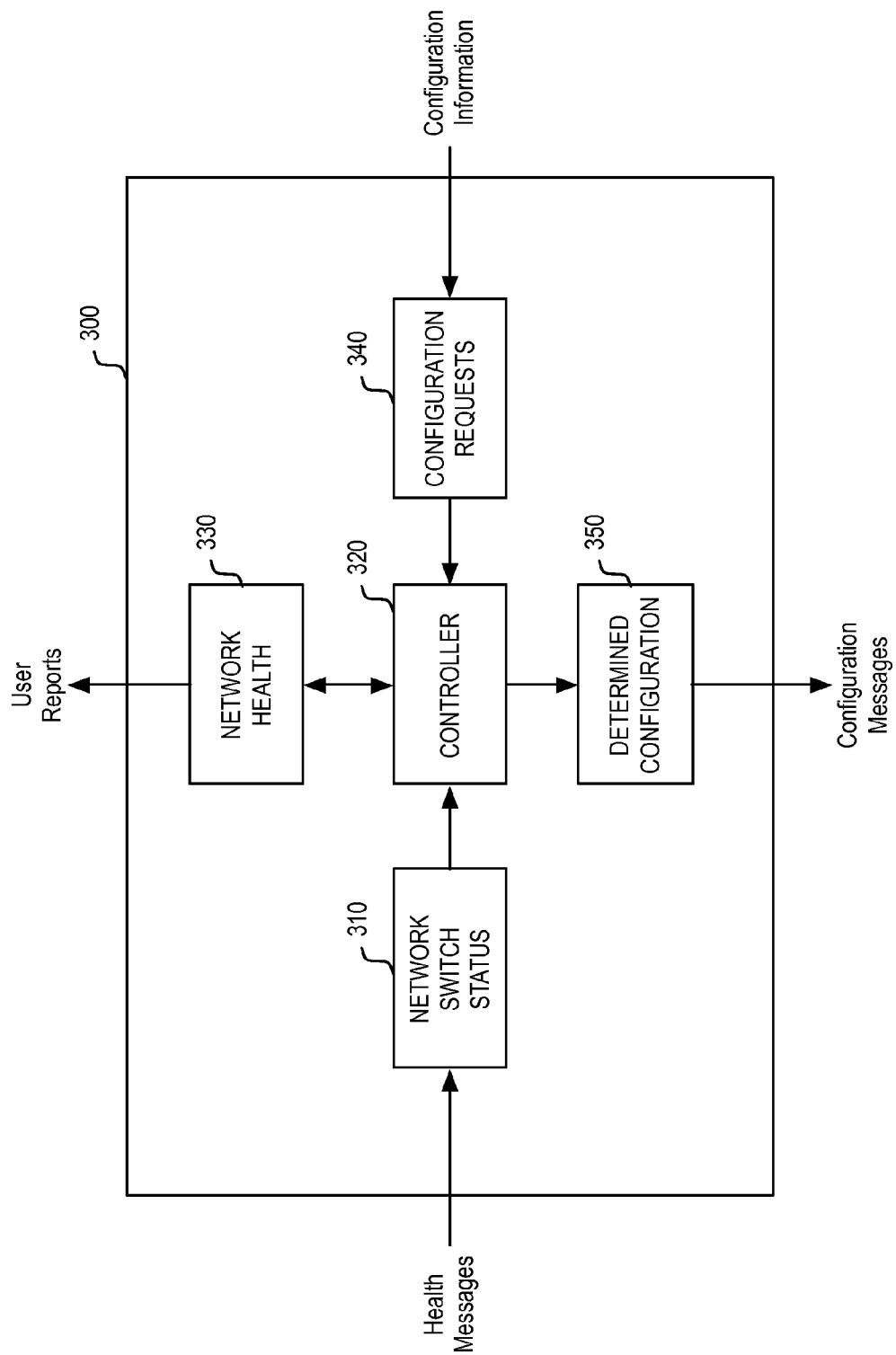
FIG. 3 illustrates an example embodiment of a network management station.

Table utilization data can be forwarded by network switches to a network management station as part of a health message. FIG. 3 illustrates an example embodiment of a network management station. Network management station 300 receives health messages that are routed to network management station 300 via a communication network. As illustrated, the received health messages can be collected by network switch status module 310. The information contained within the health messages can be stored in raw form and/or can be extracted and prepared for storage by network switch status module 310.

In general, the health messages can include other information in addition to the table utilization information as part of the health messages. For example, network switches can include available queue information (for new applications), available buffer information (e.g., device, per port, per queue, per queue group, or other buffer-related information), path availability information (e.g., link utilization, route utilization, next-hop loading, or other connection information), and physical metrics information (e.g., power consumption, temperature, average voltage, or other measured metrics).

Based on the raw data contained in the health messages, network switch status module 310 can also derive historical metrics that convey rate of change between two measuring points. For example, network switch status module 310 can determine a change in table utilization, a number of unique table hits, a number of entries not hit (i.e., stale entries), duration of link utilization >X, average power consumption when device throughput >Y, and any other historical metric. As would be appreciated, the particular types of historical or other derived metrics would be implementation dependent.

The collection of switch-specific data by network switch status module 310 can be leveraged by network managed station 300 in determining a health of the network. In one embodiment, controller 320 in network management station 300 can be configured to access the switch-specific status information of network switch status module 310 and derive one or more measures of the health of the network. The derived one or more measures of the health of the network can then be stored in network health module 330.

In one example, controller 320 can be configured to examine the table utilization information reported by the plurality of network switches to determine a health of all or part of the network. Here, an analysis of the table utilization information across a plurality of network switches can indicate that the network switches are nearing their forwarding capacity. As would be appreciated, the particular set of status information used to determine a health of the network would be implementation dependent. Table utilization information, for example, can be analyzed along with path availability information. In another example, table utilization information can be analyzed along with power consumption information, where energy savings concerns are paramount.

The information stored by network health module 330 can form the basis of reports that are transmitted to one or more users. These network health reports can provide relevant personnel with real-time and/or historical assessments of the functioning of the network. These health reports can highlight particular network switches, sub-networks and the network as a whole.

In the present disclosure, it is envisioned that the assessment of the health of the network using table utilization information can be used by the network management station to evaluate an impact of requested new configurations (e.g., deploy X virtual machines) on the network. As illustrated in FIG. 3, configuration information from a user can be received by a configuration requests module 340. A configuration request based on the configuration information provided by the user can be evaluated by controller 320. This configuration request evaluation can be based on information stored by network health module 330. As part of this evaluation, controller 320 can be configured to determine whether or not the requested configuration is viable when deployed. Using the information stored by network health module 330, controller 320 can also estimate a network response to the deployment of the requested configuration. Here, controller 320 can leverage past network health information stored by network health module 330 to identify expected performance when the network was in a similar configuration and/or underwent similar changes in deploying a similar configuration.

Consider, for example, a request for adding 100 virtual machines to the network. Deployment and activation of virtual machines has an impact on a network in the form of new MAC addresses, VLAN lookups, queues (if queuing is performed based on virtual machines), etc. One or more network switches may not have enough resources (e.g., table entries, queues, etc.) to support deployment.

The request for adding 100 virtual machines can therefore be evaluated by controller 320 using information stored by network health module 330. Such an evaluation can be based on a resource best-fit evaluation where the configuration that adds 100 virtual machines is optimized for best use of resources (e.g., fewest table entries). For example, idle resources can be enabled when the health of the network indicates that there is 70% loading across 10% of links. In another scenario, an evaluation can be based on a minimal impact fit evaluation where the configuration that adds 100 virtual machines is optimized such that the fewest number of flows, customers, software operations, or other network factors are impacted upon deployment. As would be appreciated, the particular evaluation mechanism and the particular network health factors considered by the evaluation mechanism would be implementation dependent.

In general, the role of the evaluation mechanism by controller 320 is to examine the potential impact of a requested configuration prior to deployment of the requested configuration. Without such a mechanism, the deployment of a requested configuration can have immediate adverse consequences to flows, customers, software operations, or other network factors.

After the evaluation process, controller 320 can determine a particular configuration that is to be deployed. This determined configuration 350 can represent the entire requested configuration. Alternatively, determined configuration 350 can represent a scaled back version of the entire requested configuration. For example, instead of deploying all 100 of the requested virtual machines, controller 320 can chose to deploy only 75 of the requested virtual machines. The determined configuration 350 can then be deployed to the network using a plurality of configuration messages.

Figure 4:
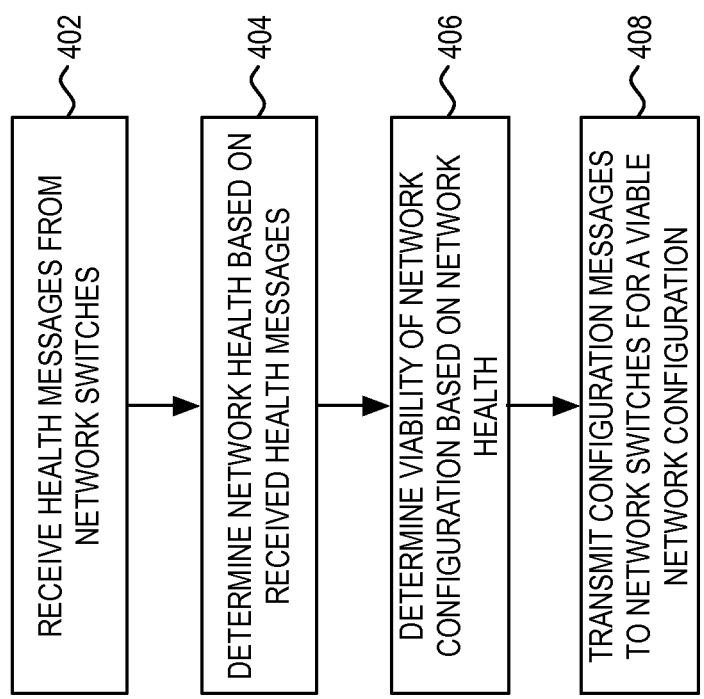
FIG. 4 illustrates a flowchart of an example process.

Having described a framework for intelligent network control using network health and management, reference is now made to the flow chart of FIG. 4, which illustrates an example process. As illustrated, the process begins at step 402 where health messages are received from a plurality of network switches. In one embodiment, the health messages can be transmitted by one or more network switches in response to a request from a network management station. Here, the network management station can transmit the request under the direction from an end user, thereby enabling the end user to probe the one or more network switches.

In another embodiment, the health messages can be sent periodically by one or more network switches to give a sampled state of the network switch. As would be appreciated, the particular reporting schedule for each network switch can be independently defined by a user.

In yet another embodiment, the health messages can be sent by a network switch only when a particular set of conditions (event) are met. For example, a network switch can transmit a health message when it is determined that a table fill level reaches 80%, buffer fill level reaches 70%, link utilization is 100% for 100 ms, etc.

At step 404, a health of the network can be determined based on the received health messages. The health of the network can be determined as a current or an historical measure. In general, any measure that is based on the network switch status as reported in the health messages can be used in the determination of a health of the network.

At step 406, a viability of a potential network configuration as defined in a configuration request can be determined based on the health of the network. This viability analysis can be used to determine whether the potential network configuration as requested can be deployed. As an alternative, the process of step 406, can be used to determine whether an alternative to the potential network configuration as requested can be deployed. For example, the alternative configuration can represent a scaled-down version of the potential network configuration as requested. In yet another example, the process of step 406 can be used in an online fashion to determine whether a current network configuration has entered into a hazardous state, as detected via health messages.

Here, it should be noted that the viability analysis of step 406 is designed to ensure that an analysis of the potential or current network configuration based on the network health is performed using the health messages. In this manner, potentially adverse impacts to the network can be avoided through the filtering of configuration requests prior to deployment or the adjustment of current network configurations.

After a potential network configuration has been screened or a current network configuration has been monitored through the viability analysis using the network health, configuration messages can be transmitted to a plurality of network switches to deploy a new network configuration at step 408. As noted, these configuration messages can be designed to deploy the fully-requested network configuration, can be designed to deploy a scaled-down or otherwise modified network configuration, or can be designed to adjust a current network configuration.

Another embodiment of the disclosure may provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A method, comprising:
   receiving, via a communications network from a plurality of network switches in a network, a plurality of health messages from the respective plurality of network switches, wherein a first health message of the plurality of health messages received from a first network switch of the plurality of network switches comprises table utilization data indicating a table fill level of one or more forwarding tables in the first network switch, the first health message being sent by the first network switch responsive to a determination that the table fill level of the one or more forwarding tables in the first network switch reaches a predetermined percentage;
   determining, by a network management station, a measure of a health of the network based at least in part on a rate of change of the table utilization of the one or more forwarding tables indicated by the table fill level over a measurement interval;
   determining, based on the determined measure of the health of the network, whether a configuration of the network can be satisfied; and
   transmitting, via the communications network, a plurality of configuration messages to the plurality of network switches to adjust a configuration of the network based on the determination.

2. The method of claim 1, wherein the receiving is in response to a request previously transmitted to the plurality of network switches.

3. The method of claim 1, wherein the receiving comprises receiving one of the plurality of health messages as part of a periodic update from one of the plurality of network switches.

4. The method of claim 1, wherein the receiving comprises receiving one of the plurality of health messages in response to an event at one of the plurality of network switches, the event occurring when a particular set of conditions is met.

5. The method of claim 1, wherein the plurality of configuration messages are designed to implement a configuration request to change a configuration of the network.

6. The method of claim 1, wherein the plurality of configuration messages are designed to adjust an active configuration of the network.

7. The method of claim 1, further comprising transmitting, via the communications network, a report of a state of the network to an end user based on the measure of the health of the network.

8. The method of claim 1, wherein the configuration request is a deployment or adjustment of a number of new virtual machines.

9. A network management station, comprising:
   a receiver that is configured to receive, via a communications network from a plurality of network switches in a network, a plurality of health messages from the respective plurality of network switches, wherein a first health message of the plurality of health messages received from a first network switch of the plurality of network switches comprises table utilization data indicating a table fill level of one or more forwarding tables in the first network switch, the first health message being sent by the first network switch responsive to a determination that the table fill level of the one or more forwarding tables in the first network switch reaches a predetermined percentage;
   a controller that is configured to determine a measure of a health of the network based at least in part on a rate of change of the table utilization of the one or more forwarding tables indicated by the table fill level over a measurement interval, and to determine, based on the determined measure of the health of the network, whether a configuration of the network can be satisfied; and
   a transmitter that is configured to transmit, via the communications network, a plurality of configuration messages to the plurality of network switches to adjust a configuration of the network based on the determination.

10. The network management station of claim 9, wherein one of the plurality of health messages is received in response to a request previously transmitted to one of the plurality of network switches.

11. The network management station of claim 9, wherein one of the plurality of health messages is received as part of a periodic update from one of the plurality of network switches.

12. The network management station of claim 9, wherein one of the plurality of health messages is received in response to an event at one of the plurality of network switches, the event occurring when a particular set of conditions is met.

13. The network management station of claim 9, wherein the plurality of configuration messages are designed to implement a configuration request to change a configuration of the network.

14. The network management station of claim 9, wherein the configuration request is a deployment or adjustment of a number of new virtual machines.

15. A method, comprising:
   receiving, via a communications network from a plurality of network switches in a network, a plurality of health messages from the respective plurality of network switches, wherein a first health message of the plurality of health messages received from a first network switch of the plurality of network switches comprises table utilization data indicating a table fill level of one or more forwarding tables in the first network switch, the first health message being sent by the first network switch responsive to a determination that the table fill level of the one or more forwarding tables in the first network switch reaches a predetermined percentage; and transmitting, via the communications network, a plurality of configuration messages to the plurality of network switches when it is determined that a configuration request of the network can at least partially be satisfied, wherein said determination is based on a measure of a health of the network based at least in part on a rate of change of the table utilization of the one or more forwarding tables indicated by the table fill level over a measurement interval.

16. The method of claim 15, wherein the plurality of configuration messages are designed to implement the configuration request in part.

17. The method of claim 1, wherein the determining the measure of the health of the network comprises:
    determining a status of forwarding capacity of the plurality of network switches using received table utilization data indicating table fill levels across the plurality of network switches.

18. The method of claim 1, wherein the determining the measure of the health of the network comprises:
    determining whether the plurality of network switches are nearing forwarding capacity using received table utilization data indicating table fill levels across the plurality of network switches.

19. The method of claim 1, wherein the first health message further comprises power consumption data of the first network switch, the method further comprising:
    determining the measure of the health of the network by analyzing the table utilization data indicating the table fill level of the one or more forwarding tables of the first network switch along with the power consumption data of the first network switch.

20. The method of claim 1, wherein the first health message further comprises path availability information of the first network switch, the method further comprising:
    determining the measure of the health of the network by analyzing the table utilization data indicating the table fill level of the one or more forwarding tables of the first network switch along with the path availability information of the first network switch.

* * * * *